United States Patent [19]
Murakami et al.

[11] Patent Number: 5,499,229
[45] Date of Patent: Mar. 12, 1996

[54] TRACK SCANNING FOR REPRODUCING ADDRESS INFORMATION BY CROSSTALK

[75] Inventors: Yoshiteru Murakami, Nishinomiya; Akira Takahashi, Nara; Kenji Ohta, Kitakatsuragi, all of Japan

[73] Assignee: Sharp Kabushiki Kaisha, Osaka, Japan

[21] Appl. No.: 346,759

[22] Filed: Nov. 30, 1994

[30] Foreign Application Priority Data

Dec. 1, 1993 [JP] Japan ................... 5-301500

[51] Int. Cl.$^6$ ........................................ G11B 7/00
[52] U.S. Cl. .................. 369/111; 369/13; 369/275.4; 369/44.26; 369/275.3
[58] Field of Search ................. 369/111, 275.1, 369/275.3, 275.4, 13, 44.26

[56] References Cited

U.S. PATENT DOCUMENTS

| 5,280,466 | 1/1994 | Tomita | 369/275.3 |
|---|---|---|---|
| 5,285,440 | 2/1994 | Matsuda | 369/275.3 |
| 5,383,176 | 1/1995 | Inui et al. | 369/275.4 |
| 5,402,411 | 3/1995 | Maeda et al. | 369/275.1 |
| 5,422,874 | 6/1995 | Birukawa et al. | 369/275.2 |
| 5,448,552 | 9/1995 | Onagi | 369/275.4 |
| 5,452,284 | 9/1995 | Miyagawa et al. | 369/275.4 |

FOREIGN PATENT DOCUMENTS

| 0176755 | 8/1985 | European Pat. Off. |
| 0499278A2 | 2/1992 | European Pat. Off. |
| 0570235A2 | 5/1993 | European Pat. Off. |
| 0588305A2 | 9/1993 | European Pat. Off. |
| 3-43693 | 7/1991 | Japan |
| 4-2939 | 1/1992 | Japan |
| 5-81717 | 4/1993 | Japan |

OTHER PUBLICATIONS

"Sony Magnetically Induced Super Resolution Magneto–Optical Disk", *Journal of Magnetics Society of Japan*, vol. 15, No. 5, 1991, pp. 838–845.

*Primary Examiner*—Georgia Y. Epps
*Assistant Examiner*—Kim-Kwok Chu
*Attorney, Agent, or Firm*—David G. Conlin; Brian L. Michaelis

[57] ABSTRACT

On an optical disk, information is recorded on both grooves and lands as guide tracks for guiding a light beam. The width of each groove and that of each land are set substantially equal to each other. A plurality of series of pits representing address information are formed in the grooves so that the series of pits in a groove and the series of pits in the adjacent grooves are located in different radial directions of the optical disk. Address pits are not formed in any of the tracks formed by the lands. When the light beam scans the track on the land, the address information is obtained by crosstalk of the series of address pits formed in the track on the groove. This structure enables the management of the addresses of tracks having thereon no address pits. When obtaining the address information by reproducing the series of address pits on the groove, since no crosstalk occurs, accurate address information is obtained.

9 Claims, 8 Drawing Sheets

TRACK SCANNING FOR REPRODUCING ADDRESS INFORMATION BY CROSSTALK

FILED OF THE INVENTION

The present invention relates to optical disks such as magneto-optical disks on which address information is pre-recorded as a series of pits, and a method for reproducing the address information.

BACKGROUND OF THE INVENTION

Research and development on magneto-optical disks as rewritable optical disks are being carried out actively, and some magneto-optical disks have been practically used as external memory for computers.

A magneto-optical disk uses a layer having a perpendicular magnetization as a recording medium, and records and reproduces information using light. The magneto-optical disk having such structures has an increased recording capacity compared with a floppy disk and a hard disk which use a layer having an in-plane magnetization.

Figure 12:
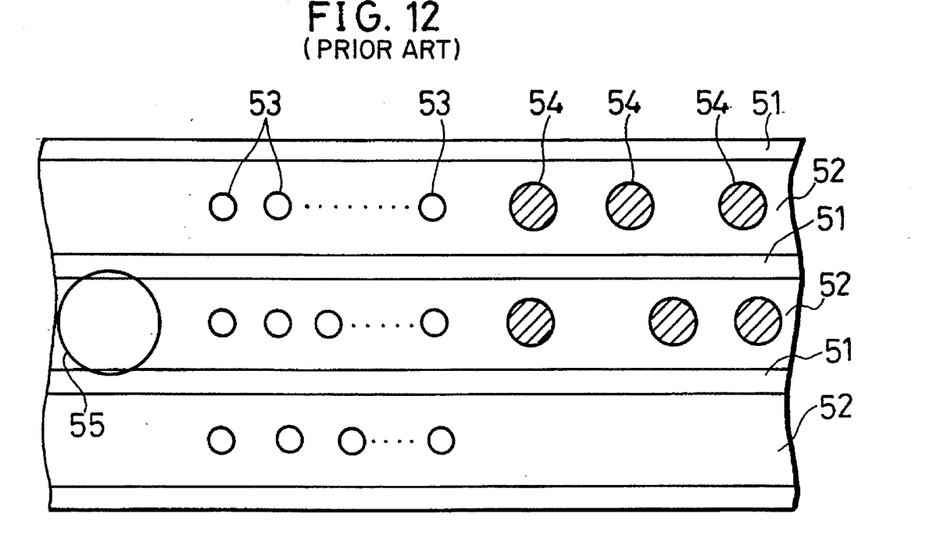
FIG. 12 is a view explaining a schematic structure of a conventional magneto-optical disk.

As illustrated in FIG. 12, a magneto-optical disk is provided with grooves 51 so that a light spot 55 accurately follows a land 52 formed between the grooves 51. Address information is recorded in the form of pits 53 on each of the lands 52 so that the address information of a track being scanned by the light spot 55 is obtained.

Information is recorded on and reproduced from tracks as lands 52. The track pitch is almost equal to the diameter of the light spot 55 which varies depending on the wavelength of laser light and the numerical aperture of an objective lens. The objective lens converges the laser light into the light spot 55. Usually, the wavelength of the laser light is between 780 nm and 830 nm and the numerical aperture of the objective lens is between 0.45 and 0.6. Thus, the diameter of the light spot 55 is set between 1.2 μm and 1.4 μm and the track pitch is set between 1.4 μm and 1.6 μm. Accordingly, the minimum diameter of an upwardly or downwardly magnetized recording domain 54 is around 0.8 μm.

Figure 13:
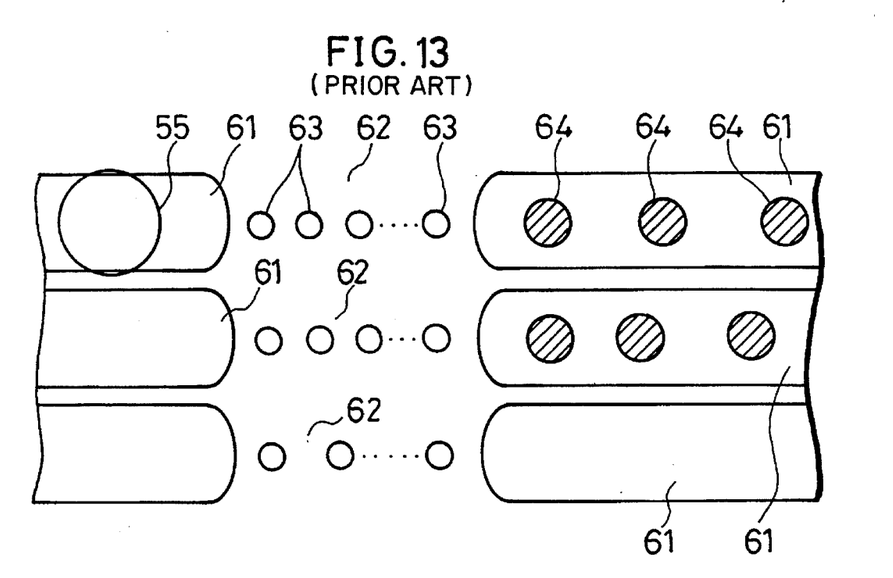
FIG. 13 is a view explaining a schematic structure of another conventional magneto-optical disk.

A magneto-optical disk having flat mirrored sections 62 shown in FIG. 13 is also well known. Although pits 63. are formed in the mirrored sections 62, the mirrored sections 62 do not have grooves 61. The light spot 55 tracks the grooves 61, and the address information of a track being scanned by the light spot 55 is obtained by reproducing the pits 63. Similarly to the above-mentioned optical disk of FIG. 12, the minimum diameter of a recording domain 64 on the groove 61 of this magneto-optical disk is around 0.8 μm.

In recent years, some methods have been proposed to increase the recording density of a magneto optical disk by using a recording film composed of magnetic layers and reproducing a recording bit of a size much smaller than the size of the light spot 55 by magnetically induced super resolution. For example, detailed descriptions of such methods are in the following documents: Japanese Publication for Unexamined Patent Application No. 81717/1993, and "Sony Magnetically Induced Super Resolution Magneto-Optical Disk", Journal of Magnetics Society of Japan, Vol. 15, No. 5, 1991, pp. 838–845.

With such a structure, since a recording bit whose size is almost a half of the above-mentioned bit size is reproducible, it is possible to reduce the track pitch to around 0.8 μm, i.e., one half of the conventional track pitch.

With the conventional structure, however, when the track pitch is reduced to a half, the distance between the pits 53 formed in adjacent tracks is also decreased to a half. This causes crosstalk, and prevents accurate address information from being obtained.

On the conventional magneto-optical disk, information is recorded on either the grooves or the lands. This structure imposes a limit to high-density recording because either the grooves or the lands are not used for recording.

SUMMARY OF THE INVENTION

An object of the present invention is to provide an optical disk from which accurate address information is obtained even when the track pitch is reduced.

Another object is to provide an optical disk which achieves a higher recording density.

In order to achieve the above objects, an optical disk of the present invention includes:

a substrate having thereon grooves and lands as guide tracks for guiding a light beam, and a series of pits recorded as address information of the tracks, wherein the grooves and the lands are arranged to have a substantially equal width so as to enable recording of information on both the tracks of the grooves and the lands, and the series of pits is formed either on the grooves or the lands, the series of pits on one of the grooves and the series of pits on the adjacent groove or the series of pits on one of the lands and the series of pits on the adjacent land are located in different radial directions of the optical disk for preventing the light beam from being simultaneously projected onto a plurality of the series of address pits on different tracks, one dimension of each of the series of pits in a radial direction of the disk being set so that, when the light beam scans a track having no address pits thereon, address information of the track is reproducible by crosstalk of the series of address pits recorded on the adjacent track.

With this structure, since the width of each groove and the width of each land are substantially equal to each other, the quality of a reproduced signal of a information recording bit recorded on the groove and that of a information recording bit recorded on the land become substantially uniform, thereby achieving stable recording and reproducing operations.

Moreover, since the series of address pits are recorded either on the groove or the land, the process of forming address pits and the disk structure become simplified compared with the case where the series of address pits are formed on both of the groove and the land. Furthermore, if address pits are recorded only on the grooves, for example, the series of address pits on the adjacent grooves are located in different radial directions. Therefore, when reproducing address information from one of the groove, the effect of crosstalk of the series of address pits on the adjacent groove is prevented, and thereby providing accurate address information.

Additionally, the address information of a track having no address pits therein is obtained by the crosstalk of the adjacent track on which the series of address pits are recorded. It is thus possible to manage the addresses of tracks on which no address pits are recorded. Since both the groove and the land are used for recording and reproduction of information, high-density recording is achieved.

With this structure, it is preferable to form the series of pits so that the center point of each pit and the center line of the groove or the land are out of alignment. This arrangement enables more accurate address information from being obtained by crosstalk.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 11 illustrate embodiments of the present invention.

FIGS. 3 (a) and 3 (b) are views explaining a schematic structure of a magneto-optical disk according to Embodiment 2 of the present invention.

FIGS. 7 (a)–(f) are views explaining a process of making a master of the magneto-optical disk of the present invention.

FIGS. 12 and 13 illustrate conventional examples.

DESCRIPTION OF THE PREFERRED EMBODIMENTS

Referring to FIGS. 1 to 11, some embodiments of the present invention are described below.

[Embodiment 1]

Figure 1:
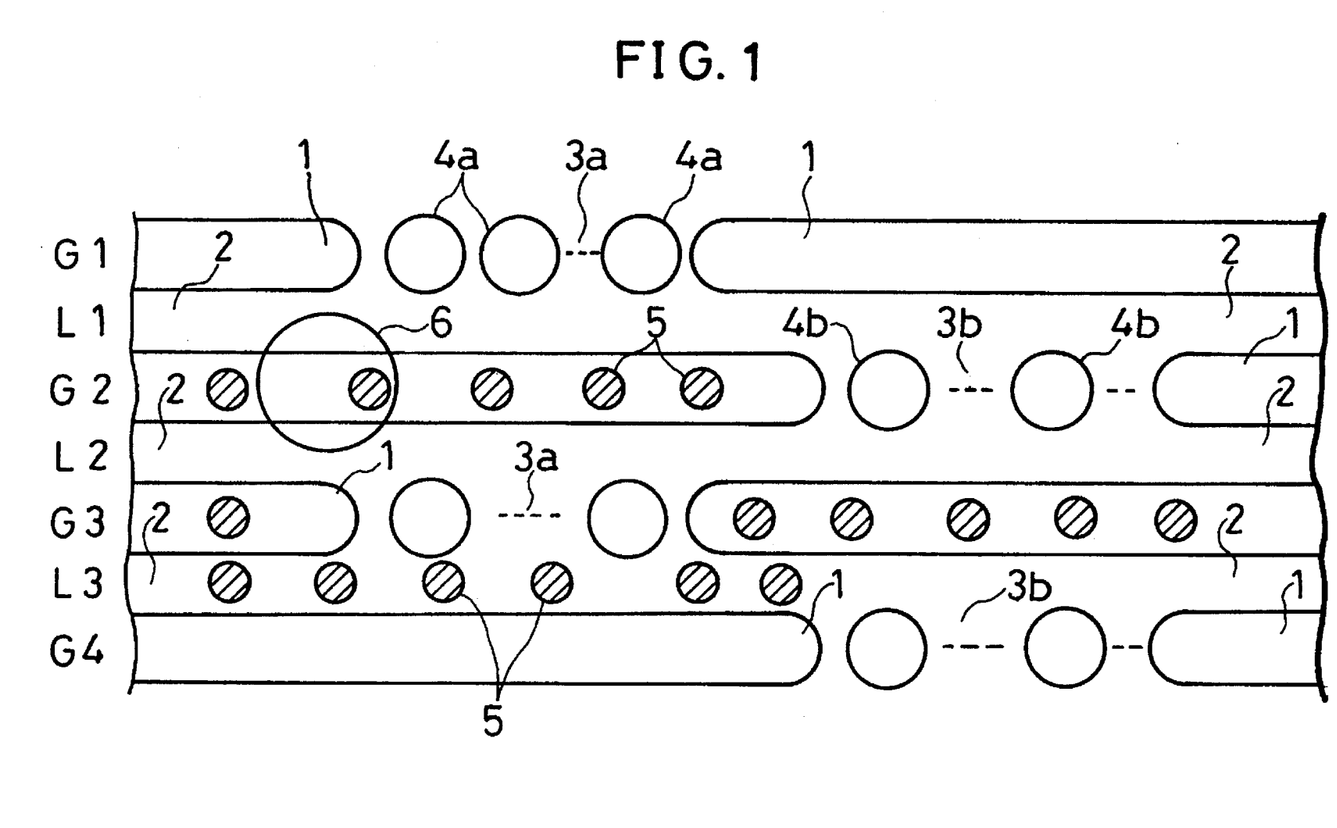
FIG. 1 is a view explaining a schematic structure of a magneto-optical disk according to Embodiment 1 of the present invention.
Figure 2:
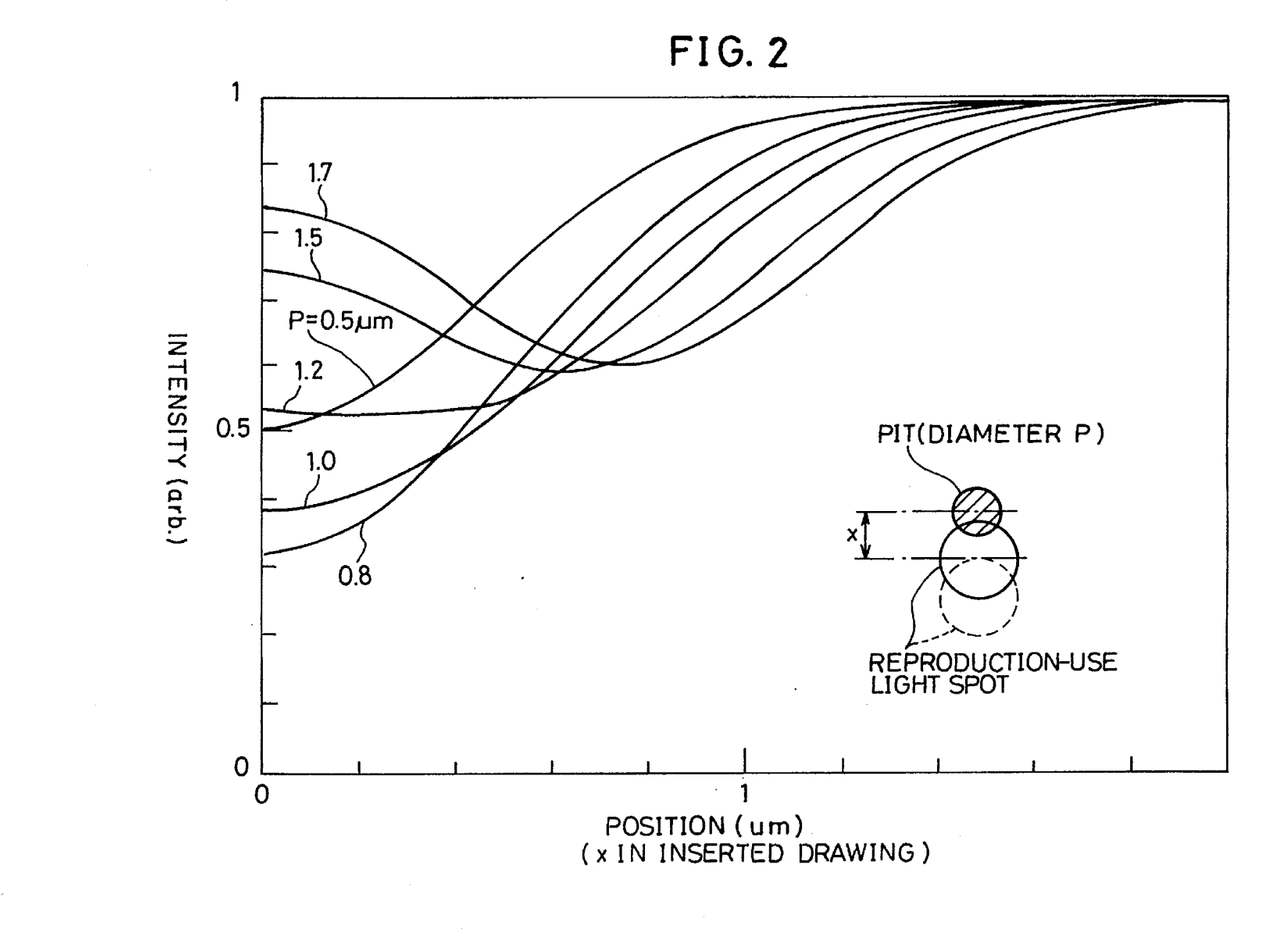
FIG. 2 is a graph showing calculated results of diffraction intensity which is used for explaining the dimensions of pits of the present invention.
Figure 6:
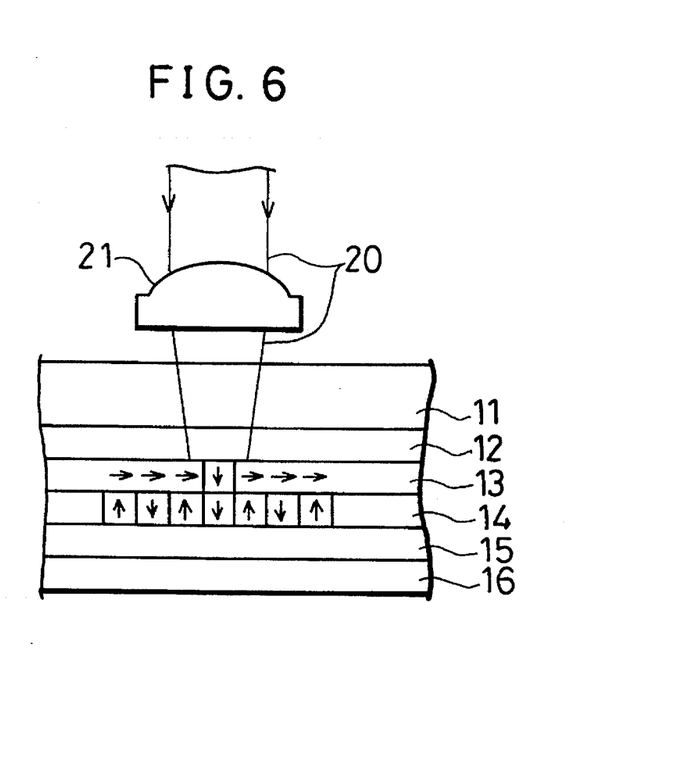
FIG. 6 is a view explaining a schematic structure of a magneto-optical disk suitable for the present invention.

The following description discusses one embodiment of the present invention with reference to FIGS. 1, 2 and 6.

As illustrated in FIG. 1, a magneto-optical disk of this embodiment is provided with concentric or spiral grooves 1. Each groove 1 is separated into a plurality of sectors, for example, 32 sectors along a circumferential direction. A portion between adjacent sectors (hereinafter referred to as the interrupted portion) forms a flat mirrored section 3. The width of each groove 1, and the width of each of lands 2 formed between the grooves 1 are substantially equal to each other.

The mirrored sections 3 of a groove 1 and the mirrored sections 3 of adjacent grooves 1 are located in different radial directions as shown in FIG. 1. For the sake of explanation, grooves and lands are numbered as G1 to G4 and L1 to L3, respectively. Additionally, the mirrored sections of G1 and G3, and the mirrored sections of G2 and G4 are represented as 3a and 3b, respectively. Moreover, pits (a first series of pits) recorded as address information in the mirrored sections 3a and pits (second series of pits) recorded as address information in the mirrored sections 3b are denoted as 4a and 4b, respectively.

With this structure, both the grooves 1 and the lands 2 function as guide tracks, and information is recorded on tracks on the grooves 1 and tracks on the lands 2. Whether a light spot 6 is arranged to follow the track on the groove 1 or the track on the land 2 is easily selected by reversing the polarity of a tracking signal. The tracking signal is generated by, for example, a push-pull method.

When the light spot 6 scans the track on the groove 1, the address information is obtained from the pits 4a or 4b. In this embodiment, since the first series of pits 4a and the second series of pits 4b are formed in different radial directions, the light spot 6 can never be projected onto the pits 4a and pits 4b at the same time. With this arrangement, it is possible to obtain accurate address information without having crosstalk.

With a method for reproducing address information of the present invention, when the light spot 6 scans the track on the land 2 on a magneto-optical disk having the above-mentioned structure, the address information is obtained by crosstalk of the pits 4a or 4b. In this case, since the first series of pits 4a and the second series of pits 4b are also formed in different radial directions, the light spot 6 can never be projected onto the pits 4a and pits 4b at the same time. It is thus possible to obtain accurate address information.

With such a method for reproducing address information, for example, since the address information is obtained by crosstalk of the pits 4a or 4b when the light spot 6 scans the track on the land 2 of a magneto-optical disk, the dimensions, particularly, the dimension (hereinafter referred to as the width) of each of the address pits 4a and 4b in a radial direction of the disk (i.e., the vertical direction in FIG. 1) are considerably important. Namely, the address pits 4a and 4b need to have a width which enables the retrieval of satisfactory address signals from the address pits 4a and 4b when the light spot 6 scans the groove 1 and of satisfactory address signals from crosstalk of the pits 4a and 4b when the light spot 6 scans the land 2. When retrieving an address signal from crosstalk by scanning the land 2 with the light spot 6, a larger pit width is advantageous. On the contrary, when scanning the groove 1 with the light spot 6, if the pit width is too large, the level of the address signal becomes smaller.

The following description discusses a desirable width of a pit of the present invention.

FIG. 2 is a. graph showing calculated results of the intensity of diffraction by pits. As shown in the inserted view in FIG. 2, a circular pit having a diameter P was formed and a distance between the center of the pit and the center of the light spot 6 was set X. With this arrangement, an intensity of reflected light from the pit was calculated. At this time, the intensity of diffraction by the pit was calculated according to a method described in an article "Characteristics of Grooves on a Magneto-Optical Disk", Yoshikazu Fujii et al., Sharp Technical Report, No. 33, 1985, pp. 27–34. The pit depth, the wavelength of reproduction-use light, and the N. A. of a converging objective lens were arranged 130 nm, 780 nm, and 0.55, respectively.

In FIG. 2, for example, if the track pitch between a groove and a land is 0.8 μm, the horizontal axis x is zero, the intensity becomes equivalent to an intensity obtained when the light spot 6 is projected onto a pit (i.e., when the center of the light spot 6 comes on the center of a pit). Similarly, if the horizontal axis x is 0.8 μm, the intensity becomes equivalent to an intensity obtained by crosstalk between pits. Since the address signals have satisfactory quality if the difference between an intensity of reflected light from a pit and that from a portion of a track having no pit is not less than 0.2. Namely, satisfactory address information is obtained from any portions in FIG. 2 if the intently obtained therefrom is not larger than 0.8.

According to FIG. 2, when the diameter P of the pit is 0.5 μm, the level of a signal obtained by crosstalk becomes unsatisfactory. Similarly, when the diameter P of the pit is 1.7 μm, the level of a signal obtained by reflected light from a pit becomes unsatisfactory. Consequently, when the track pitch is 0.8 μm, a desirable pit width (=diameter P of the pit) is between 0.8 μm and 1.6 μm.

The above-mentioned description explains a desirable dimension of a pit when the track pitch is 0.8 μm. More generally, denoting the track pitch as T (equivalent to the width of the groove 1 and of the land 2 of the present invention) and the pit width as Pw, the condition $T \leq Pw \leq 2T$ needs to be satisfied. If this condition is satisfied, even when the size of the light spot becomes smaller due to the wavelength of laser light, it is possible to decrease the track pitch according to the size of light spot.

For instance, the present invention is suitably applied to a magnetic resolution recording medium disclosed in Japanese Publication for Unexamined Patent Application No. 81717/1993. As illustrated in FIG. 6, this magneto-optical recording medium includes a transparent substrate 11, and a transparent dielectric film 12, a readout layer 13, a recording layer 14, a transparent dielectric film 15 and an overcoat film 16 formed in this order on the transparent substrate 11. The recording layer 14 is a film having perpendicular magnetization, and information is magneto-optically recorded thereon. The readout layer 13 is a film whose Curie temperature is sufficiently higher than that of the recording layer 14 and whose compensation temperature is in a range between room temperature and the Curie temperature. This magnetic film has in-plane magnetization at room temperature because in-plane magnetic anisotropy is larger than perpendicular magnetic anisotropy. When a light beam 20 is applied and when the temperature of an area exposed to the light beam 20 reaches or exceeds a predetermined temperature, the perpendicular magnetic anisotropy becomes larger than the in-plane magnetic anisotropy and the magnetic film has perpendicular magnetization. With the use of such a magneto-optical recording medium, it is possible to reproduce information only from a section of an area, which has been exposed to a center portion of the light beam converged by an objective lens 21 and has a higher temperature, using the temperature distribution of the area exposed to the light beam. This structure enables reproduction of a recording bit whose diameter is smaller than the diameter of the light beam. Thus, with the use of such a magneto-optical recording medium, the size of a recording bit 5 (see FIG. 1) is decreased to around 0.4 μm, crosstalk in reproducing a recorded bit from adjacent track is significantly reduced, and recording and reproduction are easily performed even when the width of a track (i.e., the width of the groove 1 and of the land 2 in Embodiment 1) is not larger than 0.8 μm.

If the magneto-optical recording medium is used in this embodiment, it is possible to reduce the track pitch to a half of the conventional pitch of 1.6 μm, i.e., to 0.8 μm. As a result, the recording density is significantly improved and accurate address information is obtained.

Moreover, if laser light with a shorter wavelength is used for the recording and reproduction of information, it is possible to further reduce the track pitch. For instance, when laser light with a wavelength of 458 nm is used instead of the laser light with a wavelength of 830 nm, the track pitch is further reduced to a half, thereby increasing the recording density.

[Embodiment 2]

Figure 3:
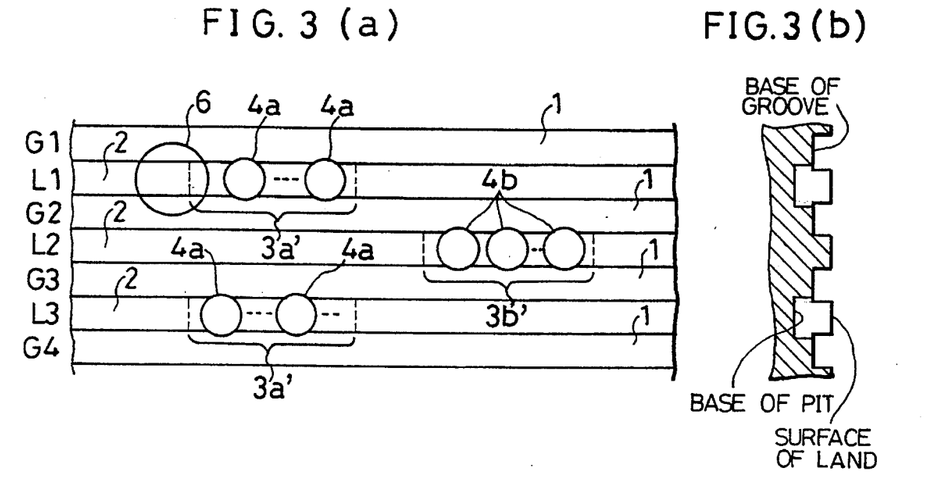

The following description discusses a second embodiment of the present invention with reference to FIGS. 3(*a*) and 3(*b*). The members having the same functions as in the above-mentioned embodiment will be designated by the same code and their description will be omitted.

Unlike the above-mentioned embodiment 1, a magneto-optical recording medium of this embodiment has pits 4*a* and 4*b* which are recorded as address information on the lands 2. The pits 4*a* and 4*b* are formed in areas 3*a*' and 3*b*' between two dot lines shown in FIGS. 3(*a*) and 3(*b*).

The address pits 4*a* and 4*b* on adjacent lands 2 are located in different radial directions of the disk.

The depth $D_P$ of each of the address pits 4*a* and 4*b* is deeper than the depth $D_G$ of the groove 1 and is preferably set to establish the following relation.

$$D_P = \lambda/4n$$

$$D_G = \lambda/8n$$

where n is the refractive index of the substrate and λ is the wavelength of laser.

Like the foregoing explanation, since the light spot 6 can never be projected onto the pits 4*a* and 4*b* simultaneously, it is possible to obtain accurate address information without having crosstalk.

As described above, an optical disk according to Embodiments 1 and 2 includes:

a substrate having grooves and lands formed thereon as guide tracks for guiding a light beams, and a series of pits recorded thereon as address information of the tracks, wherein the grooves and the lands are arranged to have a substantially equal width so as to enable recording of information on both the tracks of the grooves and the lands, the series of pits is formed either on the grooves or the lands, the series of pits on one of the grooves and the series of pits on the adjacent groove or the series of pits on one of the lands and the series of pits on the adjacent land are located in different radial directions of the optical disk so that the light beam is not simultaneously projected onto a plurality of the series of address pits on different tracks, and one dimension of each of the series of pits in a radial direction of the disk is set so that, when the light beam scans a track having no address pits thereon, address information of the track is reproducible by crosstalk of the series of address pits recorded on the adjacent track.

Therefore, when reproducing address information from a track on which the series of address information are recorded, the effect of crosstalk of the series of address pits on another track is prevented, and thereby providing accurate address information. Additionally, the address information of a track on which no address pits are recorded is obtained by the crosstalk of the adjacent track on which the series of address pits are recorded. It is thus possible to manage the addresses of tracks on which no address pits are recorded. With this structure, since both the groove and the land are used for recording and reproduction of information, high-density recording is achieved.

[Embodiment 3]

Figure 4:
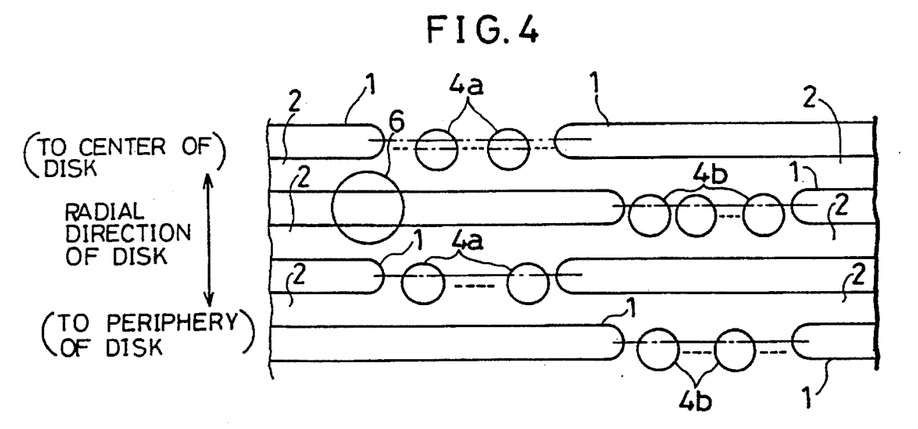
FIG. 4 is a view explaining a schematic structure of a magneto-optical disk according to Embodiment 3 of the present invention.

The following description discusses a third embodiment of the present invention with reference to FIG. 4. The members having the same functions as in the above-mentioned embodiment will be designated by the same code and their description will be omitted.

A magneto-optical disk of this embodiment has address pits formed in the grooves 1. The locations where the address pits 4a and 4b are to be formed in this embodiment (see FIG. 4) differ from those in Embodiment 1 (see FIG. 1). Specifically, in this embodiment, as illustrated in FIG. 4, the center points of the address pits 4a and 4b do not come on the center line of each of the grooves 1, shown by the alternate long and short dash line. Namely, the center points of the address pits 4a and 4b and the center line of each of the grooves 1 are out of alignment. FIG. 4 shows an example where the address pits 4a and 4b are displaced from the center lines of the grooves 1 toward the periphery of the disk (i.e., downwards in the figure). It is also possible to displace the address pits 4a and 4b from the center lines of the grooves 1 toward the center of the disk (i.e., upwards in the figure).

With this arrangement, since the level of an address signal obtained by crosstalk is increased, accurate address information is obtained. In FIG. 4, when the light spot 6 scans the track on a land 2, the level of an address signal obtained by crosstalk from address pits on the adjacent groove 1 of the land 2 on the disk center side becomes larger than the level of an address signal obtained by crosstalk from address pits on the other adjacent groove 1 on the disk periphery side. In Embodiments 1 and 2, since the level of address signal obtained from the address pits on the disk center side and that from the disk periphery side are substantially the same, it is necessary to select which address signal is to be used for managing addresses. On the other hand, in this embodiment, if an address signal obtained from larger crosstalk is used as address information, an address being scanned is known in a uniform manner.

A location where a pit is to be formed by the present invention, i.e., a preferable distance between the center of the groove 1 and the center point of a pit shown in FIG. 4 is known by the calculated results shown in FIG. 2.

With the structure of FIG. 4, if the track pitch is 0.8 μm and if the distance between the center of the groove 1 and the center point of the pit is 0.2 μm, an intensity when the horizontal axis X=0.2 μm corresponds to an intensity when the light spot is on the groove 1. Similarly, an intensity when the horizontal axis X=0.6 μm corresponds to an intensity obtained from a pit by crosstalk. Considering the fact that a satisfactory address signal is obtained when the intensity is not larger than 0.8, a pit needs to have a width around 0.5 μm to 1.7 μm. In other words, if a pit is formed so that the distance between the center of the groove 1 and the center point of the pit becomes 0.2 μm, even if the pit is 0.5 μm, it is possible to obtain crosstalk of a sufficient level when scanning a land. Hence, even such a small distance between the center of the groove 1 and the center point of the pit produces significant effects.

Figure 5:
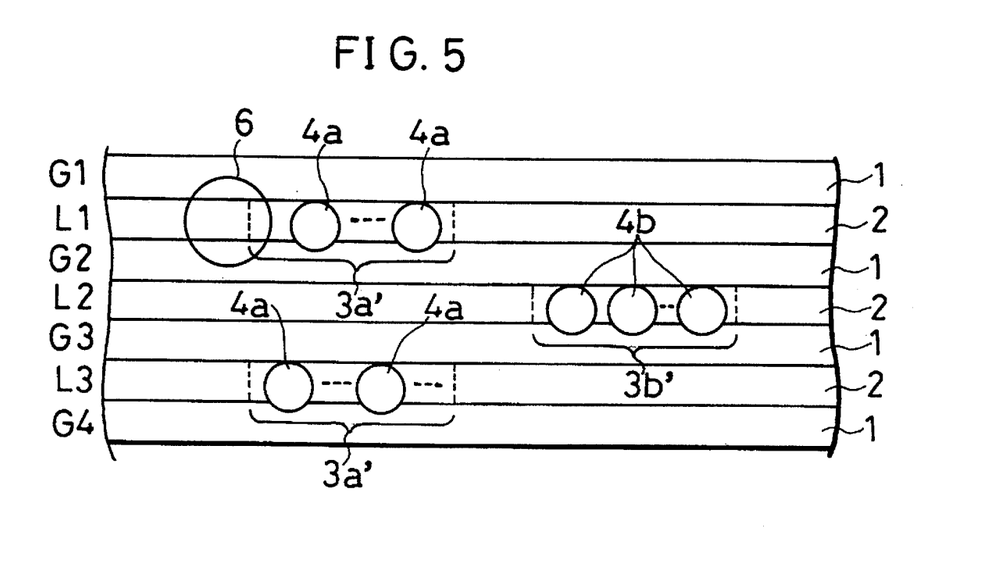
FIG. 5 is a view explaining a schematic structure of a magneto-optical disk as a modified example of Embodiment 3.

FIG. 5 shows a modified example of Embodiment 3. With this modified example, the address pits 4a and 4b are formed on the lands 2 so that the center points thereof and the center lines of the grooves 1 are out of alignment. This structure also produces the above-mentioned effects.

As described above, an optical disk according to this embodiment has the disk structure described in Embodiments 1 and 2, and the series of pits which are formed so that the center point of each pit and the center line of the groove or the land are out of alignment. This arrangement enables more accurate address information from being obtained by crosstalk.

[Manufacturing Method of Magneto-Optical Recording Medium]

With reference to FIGS. 7(a) to 7(f), the following description discusses a process of making a master of each of the magneto-optical disks described in Embodiments 1 to 3.

Figure 7A:
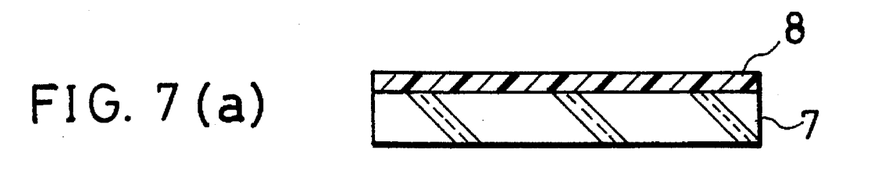
Figure 7B:
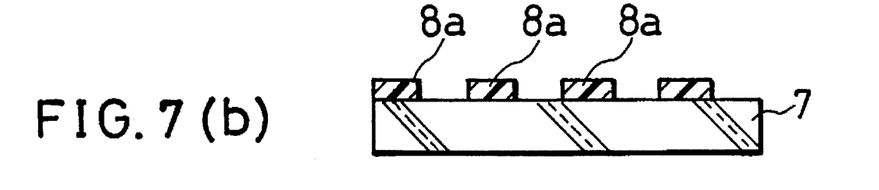

Firstly, a photoresist 8 is applied to a surface of a quartz transparent substrate 7 as shown in FIG. 7(a). Secondly, laser light is converged on the photoresist 8 so as to create desired patterns of grooves 1, pits 4a and 4b on the surface thereof. After developing the photoresist 8, unwanted portions of the photoresist 8 are removed so that photoresists 8a corresponding to the desired patterns of the grooves 1, pits 4a and 4b remain on the substrate 7 as shown in FIG. 7(b).

Figure 7C:
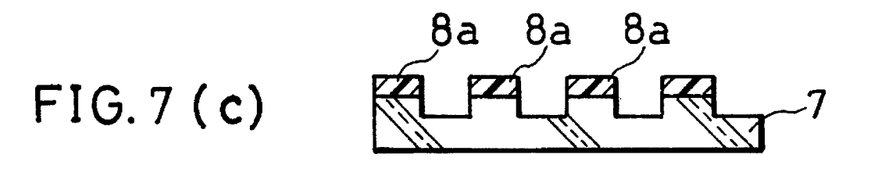
Figure 7D:
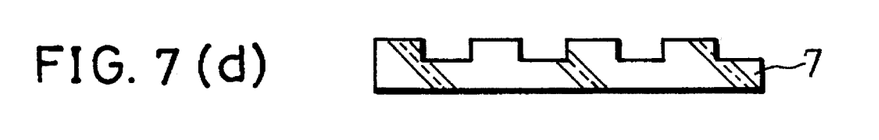
Figure 7E:
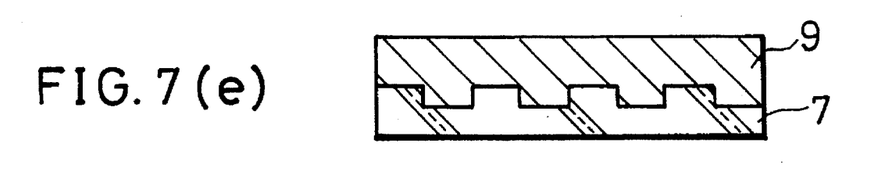
Figure 7F:
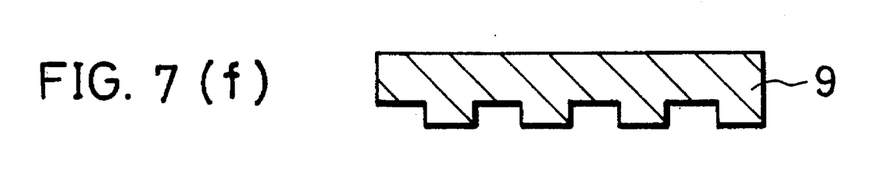

The photoresists 8a function as a mask when dry-etching the substrate 7 (see FIG. 7c). For example, $CF_4$ is used as etching gas. After etching, the photoresists 8a are removed as shown in FIG. 7(d) and a metal layer 9 made of Ni is electroformed as shown in FIG. 7(e). When the metal layer 9 is removed, a stamper is obtained (see FIG. 7(f)).

By molding plastic such as polycarbonate with the stamper, a substrate patterned with the desired grooves 1, pits 4a and 4b is obtained. When a recording medium is formed on the substrate, the magneto-optical disk is obtained.

Figure 8A:
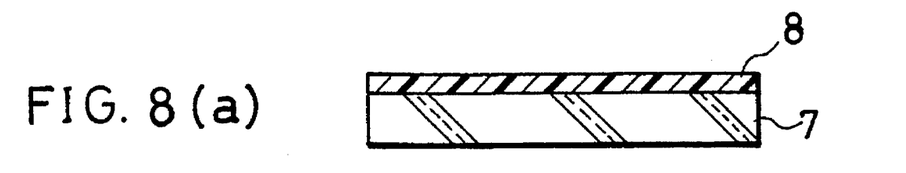
FIGS. 8(a)–(f) are views explaining the process of producing a photomask for use in the manufacture of the magneto-optical disk of the present invention.
Figure 8B:
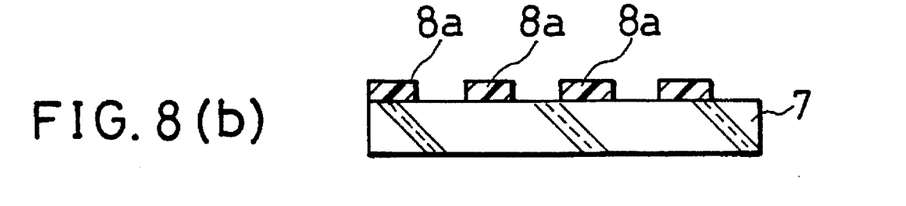
Figure 8C:
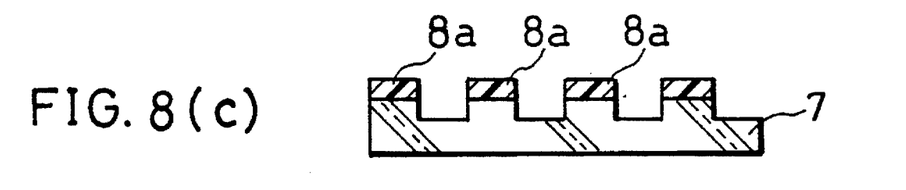
Figure 8D:
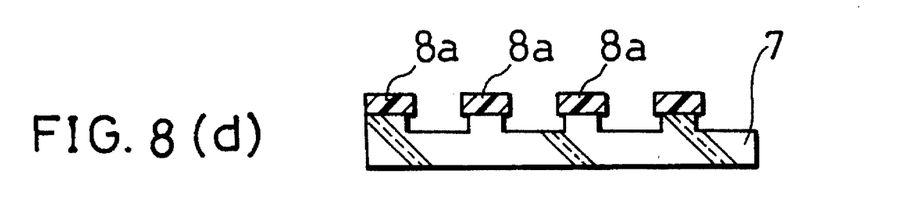
Figure 8E:
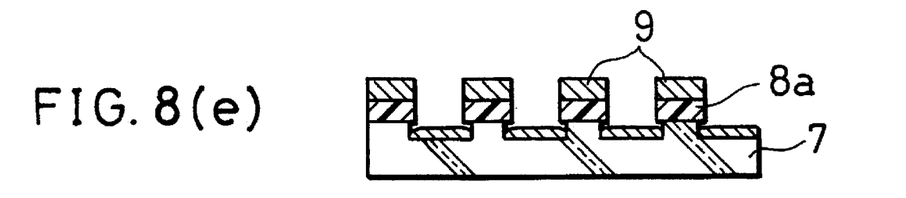
Figure 8F:
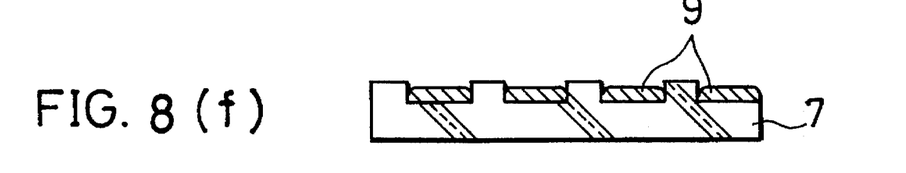

The magneto-optical disk may be obtained by producing a photomask according to a method disclosed, for example, in Japanese Publication for Examined Patent Application No. 2939/1992 after exposing the photoresist 8 in desired patterns of the grooves 1, pits 4a and 4b using the laser light, and by directly forming the grooves 1, the pits 4a and 4b on a glass substrate by contact exposure or dry-etching using the photomask. With the method of producing the photomask, after the steps shown in FIGS. 8(a) to 8(c) similar to the steps shown in (FIGS. 7(a) to 7(c), grooves are formed in portions having no photoresist 8 therein are formed by wet-etching (see FIG. 8(d)), a light-shielding thin film 9 of Cr or Ta is formed on a glass substrate having the photoresist 8 formed thereon by deposition or sputtering (see FIG. 8(e)), and the light-shielding thin film 9 on the photoresist 8d is removed together with the photoresists 8a (see FIG. 8(f)).

The formation of the grooves 1, the pits 4a and 4b is started by exposing the photoresist to, for example, Argon laser light. A device for exposing the photoresist to the Argon laser light is usually called a cutting device. There are two types of methods for exposing the photoresist using the cutting device. One is called one-beam cutting method whereby the grooves and the pits 4a and 4b are formed by a single converged beam of Argon laser. The other is called two-beam cutting method whereby the grooves 1 and the pits 4a and 4b are formed by two beams. Shortly, these methods are named according to the number of beams used.

For example, when forming a pit having a width larger than the width of the groove 1 like in Embodiment 1 shown in FIG. 1, if the one-beam cutting method is used, areas where the pits 4a and 4b are to be formed need to be exposed to a laser power which is higher than a laser power used for forming the groove 1. On the other hand, if the two-beam cutting method is employed, one of the converged laser beam is used for forming the groove 1, while the other is used for forming the pits 4a and 4b. At this time, the numerical aperture of an objective lens for converging the beam used for forming the pits may be set smaller so that the beam is converged into a spot which is much smaller than the converged beam spot used for forming the groove.

In Embodiment 2, the two-beam cutting method needs to be used so as to form the grooves by one of the beams while forming the pits 4a and 4b using the other beam. The same manufacturing method is also used in other embodiments.

Figure 9:
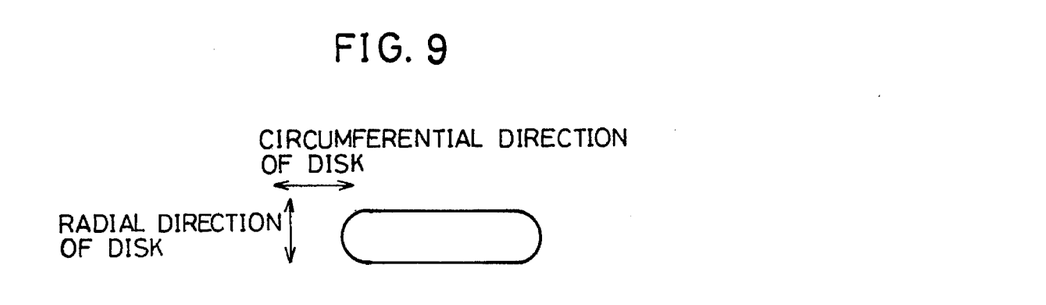
FIG. 9 is a view explaining the dimensions of pits on the magneto-optical disk of the present invention.

In FIGS. 1, 3(a), 4 and 5 of Embodiments 1 to 3, in order to simplify the explanation, circular pits 4a and 4b are shown. Actually, an address pit may be formed into a substantially circle. However, it is also possible to form an address pit into the shape of an ellipse as shown in FIG. 9. Since the present invention focused on the dimension (width) of a pit in a radial direction of a disk rather than the dimension (length) thereof in a circumferential direction of the disk, illustrations and calculations are merely made on the assumption that pits have a circular shape.

Figures 10A, 10B:
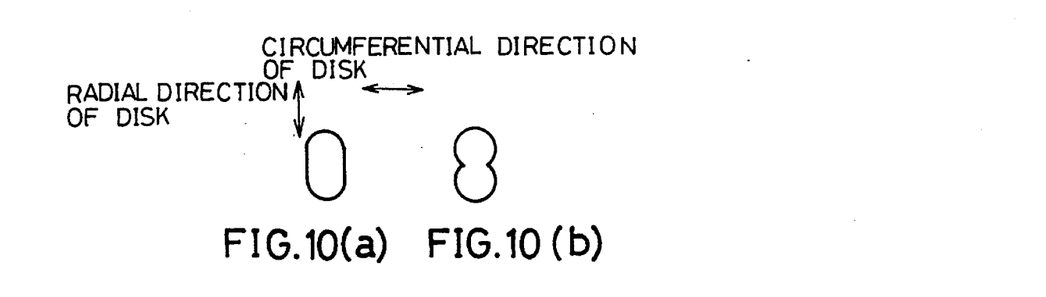
FIGS. 10(a) and 10(b) are views explaining the dimensions of pits on the magneto-optical disk of the present invention.

As explained above, since the width of the pit is important, the shape of the pit is not particularly restricted. For example, the pit may be formed into a shape as shown in FIG. 10(a). Specifically, instead of forming the pit into the shape of circle, the pit may have a shape as if obtained by stretching a circle in a radial direction of the disk as shown in FIG. 10(a). To more specifically draw the shape of the pit shown in FIG. 10(a), two small pits are connected to each other in part in the direction of the width thereof as shown in FIG. 10(b). As explained above, since a sufficient crosstalk signal is obtained even from a pit of such a small diameter of, for example, 0.5 μm by forming the pit so that the center point of the pit does not align with the center line of the groove. It is thus possible to form the pit into the shape shown in FIG. 10(b). If the pit is formed into such a shape, it is possible to reproduce an address signal of an extremely short period (i.e., address signal having a relatively high frequency).

The pit is easily formed into the shape shown in FIG. 10(b) by using two-beam or three-beam cutting method. The formation of a pit with the two-beam cutting method is discussed with reference to FIG. 11.

Figure 11:
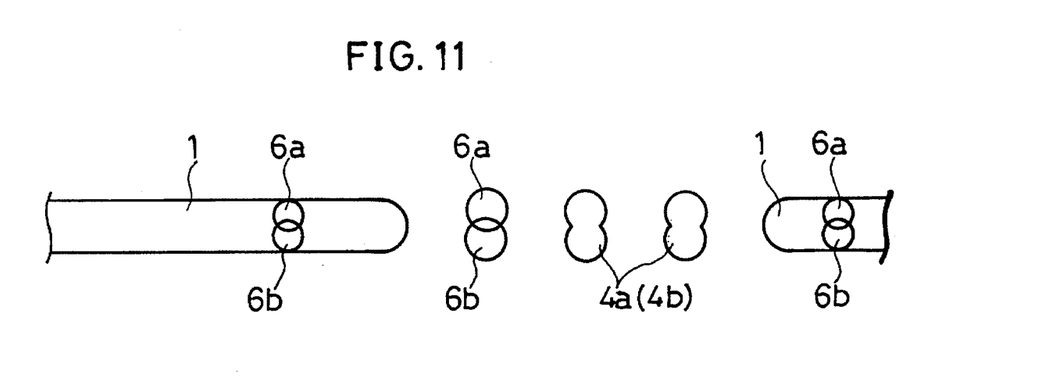
FIG. 11 is a view explaining the process of forming pits of the present invention.

Two beams 6a and 6b are converged into extremely small spots so that the beam spots partly overlap. The photoresist is exposed by changing the degree of overlapping between the grooves 1 and the pits. Moreover, the exposed area in a pit section may be made larger than in a groove section by increasing the laser power for forming the pits compared with the laser power used for forming the groove 1. Furthermore, when the three-beam cutting method is used, the grooves 1 are formed by one of the beams while forming the pits with the other two beams.

A magneto-optical disk is explained as one example of optical disk in the above-mentioned embodiments. However, the present invention is also applicable to a wide range of optical disks having address information in the form of physical pits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk comprising:

a substrate having thereon grooves and lands as guide tracks for guiding a light beam, and a series of address pits recorded as address information of said tracks, wherein said grooves and said lands are arranged to have a substantially equal width so as to enable recording of information on both the tracks formed by said grooves and said lands, the series of address pits is formed on the track of either one of said groove or said land, the series of pits on one of said grooves or lands and the series of pits on the adjacent groove or land are located in different radial directions of said optical disk for preventing the light beam from being simultaneously projected onto a plurality of the series of address pits on different tracks, and each of the series of pits in a radial direction of said disk has such a width that, when the light beam scans a track having no address pits thereon, address information of the track is reproducible by crosstalk of the series of address pits recorded on the adjacent track.

2. The optical disk according to claim 1, wherein said optical disk satisfies a relationship $$T \leq Pw \leq 2T$$

where T is a track pitch and Pw is a dimension of each of the series of address pits in the radial direction of said disk.

3. The optical disk according to claim 1, wherein said optical disk is a magneto-optical recording medium for magneto-optically recording information.

4. The optical disk according to claim 3, wherein said magneto-optical recording medium comprises:

a recording layer made of a film having perpendicular magnetization, for magneto-optically recording information; and a readout layer whose Curie temperature is sufficiently higher than a Curie temperature of said recording layer and whose compensation temperature is in a range between room temperature and the Curie temperature thereof, said readout layer having in-plane magnetization in which in-plane magnetic anisotropy is larger than perpendicular magnetic anisotropy at room temperature, and perpendicular magnetization in which perpendicular magnetic anisotropy is larger than in-plane magnetic anisotropy when an area of said readout layer exposed to the light beam by an application of the light beam reaches or exceeds a predetermined temperature.

5. The optical disk according to claim 1, wherein a center point of each of the series of address pits and a center line of each of said grooves or said lands are out of alignment.

6. The optical disk according to claim 5, wherein said optical disk is a magneto-optical recording medium for magneto-optically recording information.

7. The optical disk according to claim 6, wherein said magneto-optical recording medium comprises:

a recording layer made of a film having perpendicular magnetization, for magneto-optically recording information; and a readout layer whose Curie temperature is sufficiently higher than a Curie temperature of said recording layer and whose compensation temperature is in a range between room temperature and the Curie temperature thereof, said readout layer having in-plane magnetization in which in-plane magnetic anisotropy is larger than perpendicular magnetic anisotropy at room temperature, and perpendicular magnetization in which perpendicular magnetic anisotropy is larger than in-plane magnetic anisotropy when an area of said readout layer exposed to the light beam by an application of the light beam reaches or exceeds a predetermined temperature.

8. A method for reproducing address information from an optical disk including a substrate having thereon grooves and lands as guide tracks for guiding a light beam, and a series of address pits recorded as address information of said tracks, said grooves and said lands being arranged to have a substantially equal width so as to enable recording of information on both the tracks formed by said grooves and said lands, the series of address pits being formed on the track of either one of said groove or said land, the series of pits on one of said grooves or lands and the series of pits on the adjacent groove or land are located in different radial directions of said optical disk for preventing the light beam from being simultaneously projected onto a plurality of the series of address pits on different tracks, said method comprising the steps of:

applying a light beam to one of the tracks to follow the track;

when the light beam scans a track having thereon the series of address pits, reading the address information by a signal obtained from the series of address pits on the track; and when the light beam scans a track having thereon no address pits, reading the address information by a crosstalk signal obtained from the series of address pits on the adjacent track.

9. A method for reproducing address information from an optical disk including a substrate having thereon grooves and lands as guide tracks for guiding a light beam, and a series of address pits recorded as address information of said tracks, said grooves and said lands being arranged to have a substantially equal width so as to enable recording of information on both the tracks formed by said grooves and said lands, the series of address pits being formed either on the track of said groove or said land, the series of pits on one of said grooves or lands and the series of pits on the adjacent groove or land are located in different radial directions of said optical disk for preventing the light beam from being simultaneously projected onto a plurality of the series of address pits on different tracks, and a center point of each of the series of address pits and a center line of each of said grooves or said lands being out of alignment, said method comprising the steps of:

applying a light beam to one of the tracks to follow the track;

when the light beam scans a track having thereon the series of address pits, reading the address information by a signal obtained from the series of address pits on the track; and when the light beam scans a track having thereon no address pits, reading the address information by a crosstalk signal obtained from the series of address pits on the adjacent track.

* * * * *